June 30, 1970 D. N. CAMPBELL 3,517,525
COOLING APPARATUS EMPLOYING THE JOULE-THOMSON EFFECT
Filed June 24, 1968 4 Sheets-Sheet 1

INVENTOR
DAVID N. CAMPBELL
BY
Watson, Cole, Grindle & Watson
ATTORNEY

June 30, 1970  D. N. CAMPBELL  3,517,525
COOLING APPARATUS EMPLOYING THE JOULE-THOMSON EFFECT
Filed June 24, 1968  4 Sheets-Sheet 2

INVENTOR
DAVID N. CAMPBELL
BY
Watson, Cole, Grindle & Watson
ATTORNEY

June 30, 1970  D. N. CAMPBELL  3,517,525
COOLING APPARATUS EMPLOYING THE JOULE-THOMSON EFFECT
Filed June 24, 1968  4 Sheets-Sheet 4

INVENTOR
DAVID N. CAMPBELL

BY Watson, Cole, Grindle & Watson
ATTORNEY

United States Patent Office 3,517,525
Patented June 30, 1970

3,517,525
COOLING APPARATUS EMPLOYING THE
JOULE-THOMSON EFFECT
David Neil Campbell, Redditch, England, assignor to The Hymatic Engineering Company Limited, Redditch, England
Filed June 24, 1968, Ser. No. 739,225
Claims priority, application Great Britain, June 28, 1967, 29,785/67; May 3, 1968, 21,042/68
Int. Cl. F25b *19/00*
U.S. Cl. 62—222                                    11 Claims

ABSTRACT OF THE DISCLOSURE

A Joule-Thomson cryogenic cooler, producing a supply of liquid refrigerant, is provided with a valve for automatically regulating the effective area of the expansion orifice under the control of a sensor including a vapour bulb responding to the level of refrigerant liquid.

---

This invention relates to cooling apparatus of the type in which cooling is produced by expansion, through a nozzle, of a working fluid in the form of gas under pressure, which before expansion is at a temperature below its inversion temperature, so as to produce a supply of liquefied working fluid in a container.

It will be appreciated that the term nozzle is used herein to cover any conventional or preferred static device permitting expansion of gas, whether it be a plain orifice, a specially shaped nozzle, or a number of orifices whether alone or associated with a porous plug or membrane.

Such coolers may be used to produce liquefied gas which is used to remove heat from a body to be cooled, the load, by evaporation. Where the ambient temperature of the environment or the load varies widely, the amount of heat to be extracted in order to keep the load within a given temperature range will also vary.

According to the present invention a cooling apparatus is provided in which cooling is produced by expansion of a working fluid from a supply in gaseous form and at a temperature below its inversion temperature, through a nozzle, located in a container to produce a supply of liquefied working fluid which collects in the bottom of the container, and includes modulating means to modulate the amount of gas flowing through the nozzle, including a sensor located in the container at least partly below the level of the nozzle, and so as to come into heat exchange relationship with the liquid, and arranged to reduce the amount of gas flowing through the nozzle when the liquid level in the container exceeds a given level.

Preferably the flow of working fluid is regulated by altering the effective flow area of the expansion nozzle.

In one form of the invention the apparatus includes a needle valve co-operating with a seating forming the expansion nozzle, to alter its effective area, and mounted to be movable transversely to centre itself relative to the seating. Alternatively the same purpose may be served by a valve having a flat obturating surface co-operating with a flat seating. One of the co-operating surfaces may be grooved to restrict the area over which pressure can build up, while providing an additional area limiting relative tilting.

Conveniently the sensor includes a vapour bulb situated within the container below the nozzle and communicating with an expansible member having a movable end connected to a movable restricting member co-operating with the nozzle to alter its effective flow area.

In some cases it is found that where the sensor includes a vapour bulb extending to its lowest point, the transfer of heat from the vapour bulb to the liquid working fluid contacting the sensor has an on/off characteristic and produces rather harsh action resulting in hunting. Thus in one form of the invention the sensor includes a vapour bulb having an extended tail extending a substantial distance below the bottom of the vapour space so as to be progressively cooled by the liquefied working fluid as it rises towards the bottom of the vapour space.

The expansion nozzle may be so shrouded or otherwise arranged as to prevent working fluid from it from impinging on the sensor, for example in the form of spray.

If the expansion nozzle is located centrally within a surrounding tubular casing and the sensor or its tube extends down past it on one side, there is a possibility, if the apparatus is as compact as may be desirable, that the clearances between the sensor or its tube and other parts will be so small that droplets of liquid working fluid may lodge in them by capillary action and gives rise to spurious response. To prevent this the sensor or its tube and the expansion nozzle may be offset in opposite directions from the axis of the apparatus, the sensor being spaced from other parts by a clearance sufficient to prevent retention of drops of liquid working fluid by capillary action.

The cooling apparatus may comprise two stages, one or each of which is provided with modulating means for automatically modulating the amount of gas flowing through the nozzle of that stage. Where the last stage is provided with modulating means the benefit will be particularly felt in the case where the cooling load varies widely. On the other hand it may be particularly desirable to provide automatic modulating means for the first stage where a wide variation of ambient temperature is experienced.

The invention may be put into practice in various ways but certain specific embodiments will be described by way of example with reference to the accompanying drawings in which.

Figure 1:
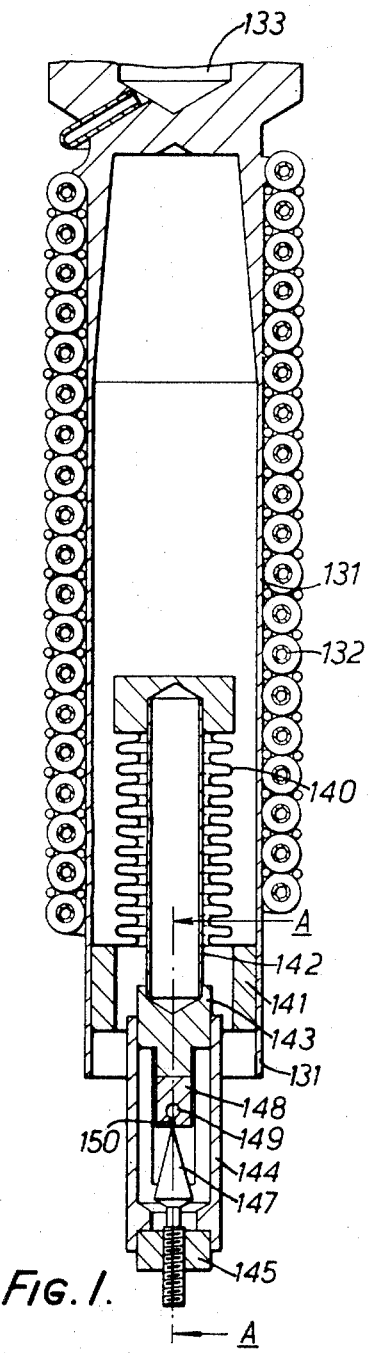
FIG. 1 is a diagrammatic central longitudinal section of a preferred form of Joule-Thomson cooler, using nitrogen as working fluid, with the sensor removed for clarity.
Figure 4:
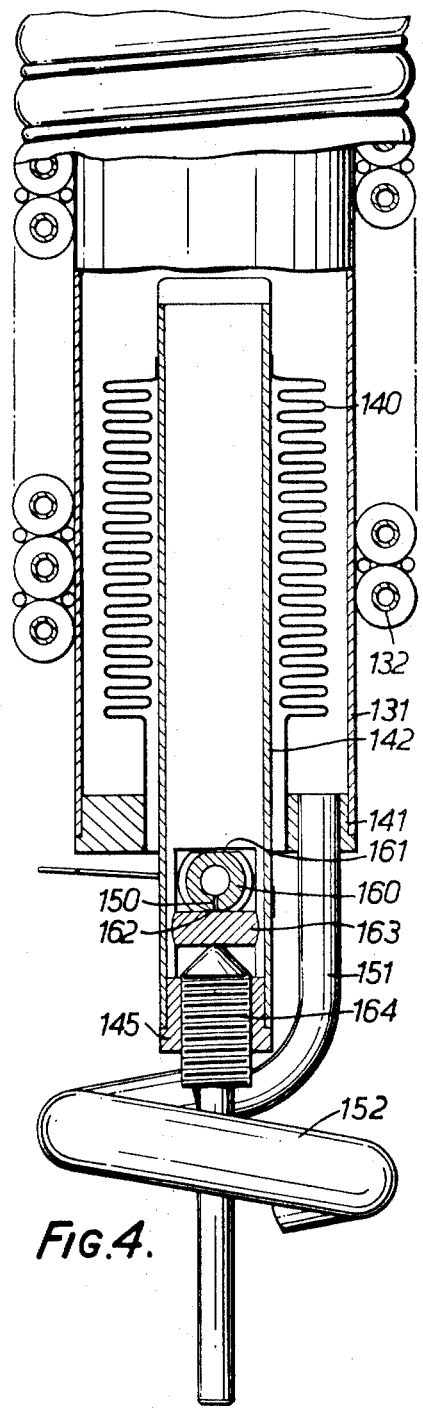
Figure 5:
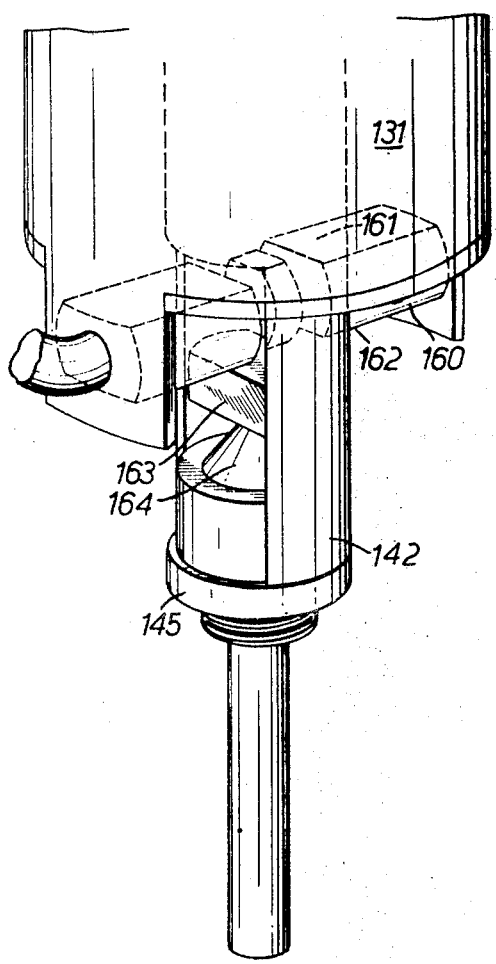

FIGS. 4, 6, 7, and 8 are diagrammatic central longitudinal sections similar to FIG. 1, of a number of modified constructions; and FIG. 5 is an enlraged diagrammatic perspective view of the nozzle and associated parts of FIG. 4.

A Joule-Thomson cooler is one which employs the Joule-Thomson effect, namely relying on isenthalpic expansion of a gas below its inversion temperature through an expansion nozzle, to produce cooling of the working fluid below its liquefaction temperature to produce liquefaction of at least a portion of the working fluid.

Thus the embodiments of the invention shown in FIGS. 1 to 7 can only be used to cool a gas which is already below its inversion temperature. Nitrogen has an inversion temperature of 620° K. (347° C.) and can thus be cooled directly from bottle storage, which may be at a temperature as high as 75° C., and since it is already well below its inversion temperature this produces a useful amount of liquefied nitrogen at a useful rate.

When a gas such as neon is to be used as the working fluid although it is below its inversion temperature, 430° K. (157° C.) it is desirable to precool it before it is further cooled by a Joule-Thomson cooler if a useful amount of liquefied neon is to be produced at a useful rate. Thus in a preferred method of using the present invention with neon as the working fluid the initial supply of neon from bottle storage which may be at a temperature as high as 75° C. is precooled to 50° K. and then fed to the Joule-Thomson cooler which cools at least some of it down to its liquefaction temperature, namely 28° K. producing a useful supply of liquid neon.

This precooling may be by any convenient known method or apparatus or may be by an expansion engine working on the Claude cycle.

The Joule-Thomson cooling apparatus, with which the present invention is concerned, is characterised by a sensor situated below the expansion orifice and serving to provide control of the obturation of that orifice in accordance with the level of liquid working fluid.

Figure 2:
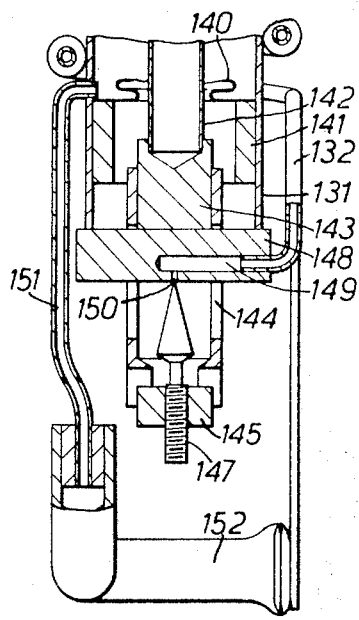
FIG. 2 is an enlarged section on the line A—A of FIG. 2 but including the sensor.
Figure 3:
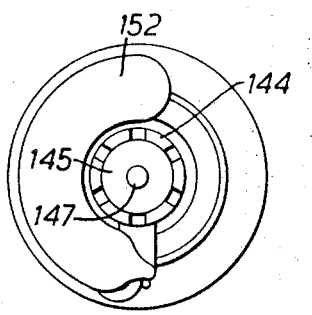
FIG. 3 is a bottom plan view of FIG. 2.

The cooling apparatus shown in FIGS. 1 to 3 is of elongated form and for purposes of description it will be assumed that it is placed vertically with its cold end at the bottom.

The apparatus includes an annular heat exchanger comprising a tubular body 131 around which is helically wound a finned coiled inlet tube 132. Although not shown, an external coaxial tube, which may be the inner wall of a Dewar flask, is located round the finned coil 132 and the space between the body 131 and the external tube provides a path for exhaust gas flowing past the fins to cool the incoming high-pressure working fluid within the tube 132. The lower end of the external tube is closed to provide a reservoir in which the liquid working fluid can accumulate. The upper end of the helical finned tube 132 communicates with a central bore 133 in the upper end of the body to which working fluid under pressure is supplied.

At its lower end the body 131 carries a cross-bar 148 extending across it transversely and having in it a horizontal bore 149 from which an orifice 150 opens downwards to form the expansion nozzle of the Joule-Thomson cooler. The lower end of the helical heat exchanger tube 132 is secured in the open end of the bore so as to communicate with the expansion nozzle.

The effective area of the expansion nozzle is arranged to be controlled by means of a needle valve 147 which is itself controlled by a bellows 140.

The bellows 140 has its open lower end secured to a collar 141 which in turn is secured in the bottom of the body 131 of the heat exchanger whilst its movable upper end is connected to the upper end of a depending tube 142. This is secured by a block 143 to a slotted tube 144 having in its lower end a plug 145 with a threaded opening to receive the needle regulator valve 147 which projects upward so that its pointed end can enter the expansion nozzle 150. The cross-bar 148 in which the nozzle is formed extends through a pair of longitudinal slots in the slotted tube 144.

The space outside the bellows communicates through a tube 151 with a generally semicircular vapour bulb 152 (not shown in FIG. 1) lying in a horizontal plane below the expansion nozzle to form a temperature sensor.

Thus, in operation, the working fluid supplied from bottle storage (for example nitrogen at 75° C. or neon preferably precooled to 50° K.) passses through the helical inlet tube 132 and, on expanding through the expansion nozzle 150, becomes cooled. Part of the working fluid liquefies and collects in the bottom of the vacuum flask. Any expanded and thus cooled gas which is not liquefied passes out through the heat exchanger through the passage formed between the external tube and the body 131. This gas is at a lower pressure than the initial supply and is either vented to atmosphere or is returned for recompression.

The liquefied working fluid produced by the cooling apparatus is used to extract heat from a body to be cooled, which may either be located below the apparatus and within the vacuum flask, or may be located at some point remote from the vacuum flask and exposed to the liquefied working fluid by suitable piping and pumping arrangements (not shown).

It will be appreciated that the amount of heat to be extracted in order to keep the load within a given temperature range will vary depending on the temperature of the surroundings in which the load and the cryogenic apparatus are located. In addition, if the load itself is generating heat intermittently, for example, if the load is an intermittenly operated electrical apparatus, the amount of heat to be extracted from the load itself will also vary.

When the liquid refrigerant collects in the bottom of the vacuum flask its surface will reach the vapour bulb 152 when it is still well below the expansion nozzle 150. When it does so it cools the vapour bulb 152 which contains a fluid, for example a similar fluid to the working fluid, which tends to condense at the temperature of the liquid working fluid so as to reduce the pressure outside the bellows and cause them to expand upwards thereby causing the needle valve to close the expansion nozzle.

Accordingly the arrangement provides an automatic control of the rate of gas flow in accordance with the amount of refrigerant liquid in the bottom of the vacuum flask, and enables the gas flow to be reduced or cut off when quite a small supply of liquid has accumulated in the bottom of the reservoir and before it has reached the level of the expansion nozzle. Thus the liquid does not in any way interfere with the expansion of the gas and in addition quite a small quantity of liquid can be automatically maintained, irrespective of the load and ambient temperature.

FIGS. 4 and 5 show a further construction very similar to that of FIGS. 1 to 3 except that the needle valve is replaced by a valve of which the operating surface is substantially flat. As in FIGS. 1 to 3 the nozzle orifice is formed in a crossbar 160 carried by the body 131 of the heat exchanger and having flats 161 and 162 in its upper and lower surfaces, in the latter of which the nozzle orifice is formed. In addition the crossbar 160 is formed with a pair of grooves 165, one on either side of the orifice, so as to limit the area over which pressure can build up tending to open the valve. At the same time the opposed areas of the flat surfaces beyond the grooves serve to limit any relative tilting.

The valve itself is constituted by a block 163 fitting loosely in the tube 142 and having a flat face to bear against the lower flat 162 of the crossbar 160. The valve block 163 rests in the slotted tube 142 and is supported by means of an adjusting screw 164 which replaces the screwed needle valve 147 of FIGS. 1 to 3.

The form of valve shown in FIGS. 4 and 5 is particularly suitable where the apparatus is subject to vibration. Thus a needle valve entering a seating may come into contact with its seating and be subject to wear, whereas flat surfaces are unlikely to wear and may not even come into contact.

In other respects the construction of FIGS. 4 and 5 is similar to that of FIGS. 1 to 3 and bears the same reference numerals.

Figure 6:
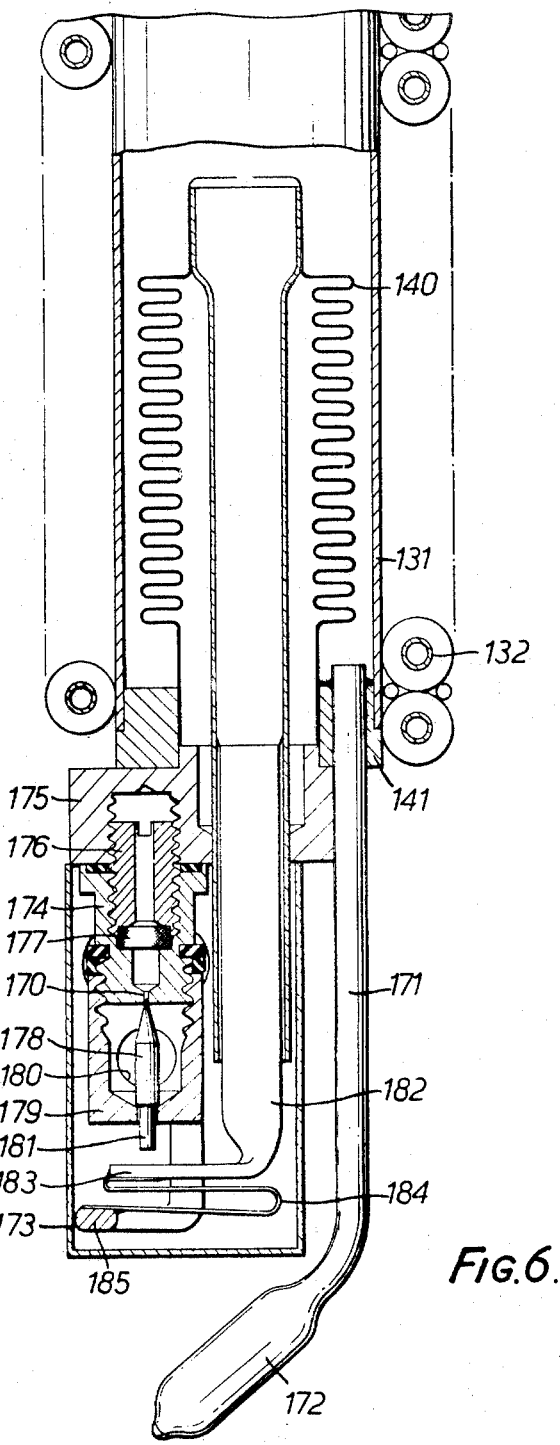

FIG. 6 shows a further arrangement, similar in general to that of FIGS. 1 to 3. In this case, it will be noted first that the expansion nozzle 170 is offset from the axis of the apparatus in the opposite direction from the tube 171 leading to the sensor bulb 172 (which is of rather different shape). The purpose of this is to arrive at a compact construction, without bringing the sensor bulb and its tube too close to the wall of the container, or to the expansion nozzle and associated parts. If these clearances are too small, there is a possibility that dropples of liquid refrigerant may lodge by capillary action in contact with the sensor bulb or its tube, and give a spurious indication tending to close the nozzle when in fact the sensor bulb is not dipping into liquid refrigerant.

Secondly, the expansion nozzle and associated parts are surrounded by a shroud 173 to prevent cold vapour from the expansion nozzle impinging on the sensor bulb, and again giving a spurious indication of the amount of liquid refrigerant present. The form and arrangement of the valve in FIG. 6 also differs from that in FIGS. 1 to 3. Thus the nozzle orifice 170 is formed in the lower end of a threaded plug 174 secured to a block 175 fixed to the collar 141 in the lower end of the inner sleeve 131. The threaded plug 174 is secured to the block 175 by a screwed sleeve 176 which also serves to retain a porous plug or filter 177 through which the working fluid is compelled to pass on its way to the expansion nozzle so as to condense and filter out any impurities which might otherwise block the expansion nozzle.

The arrangement incorporates a floating needle valve 178 enclosed within and guided by a thimble 179 threaded on to the threaded plug 174 and having holes 180 for the working fluid to escape. The valve 178 has a tail 181 extending through a hole in the end of the thimble by which it is guided and of which the margin forms a stop limiting the opening movement of the valve. This hole is of triangular section to allow a passage for warm gas to unfreeze the valve, if necessary, when the apparatus is started up. The upper end of the bellows has secured to it a depending tube 182 the lower end of which is bent sideways to form a foot 183 extending under the tail of the needle valve so as to engage it and close the valve when the upper end of the bellows moves upwards.

It will be appreciated that the force exerted by the bellows is not quite in line with the needle valve. To take care of this the foot 183 is connected by means of an S-shaped leaf spring or guide blade 184 to a fixed part, in particular the bight of a hair-pin shaped rod 185 with its end bent to L form. This blade guides the tube 182 fixed to the bellows so as to constrain it to move in a straight line thereby preventing it from tending to tilt the needle valve.

Figure 7:
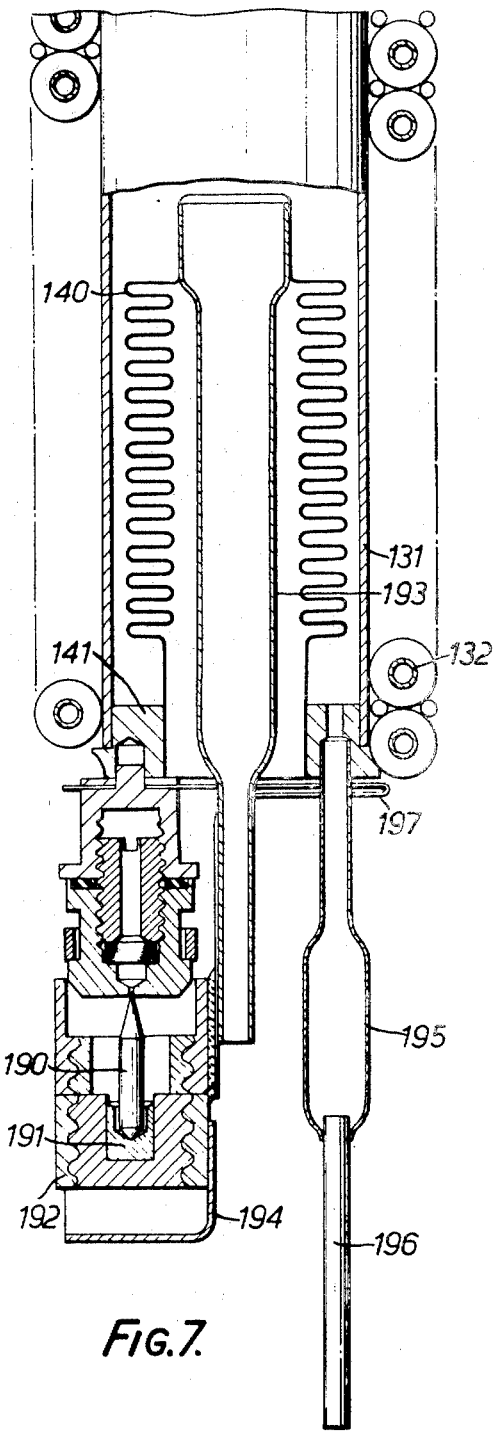

FIG. 7 shows a further arrangement, which again differs in certain details. Here again the needle valve 190 is floating but in this case its end remote from the orifice, instead of being provided with a tail, is of conical form engaging a seating formed in a screwed plug 191 threaded into a thimble 192 which is rigidly secured, as by welding, to the lower end of the tube 193 secured to the upper end of the bellows. In this arrangement again a shroud is provided, but in this case it takes the form of a partial cage 194 formed of wire gauze. This serves to intercept any liquid droplets while allowing free escape of exhaust vapour. The tube 193 is provided with an S-shaped guide blade 197 serving the same function as the blade 184 of FIG. 6.

FIG. 7 also shows a modified form of sensor bulb intended to iron out fluctuations in operation due to variations of pressure on the bellows. In this case it will be seen that the bulb 195 itself only extends a short distance below the expansion nozzle (and indeed need not extend below it at all) but is provided with an extension 196, in the form of a metal rod which completes the sensor. In arrangements such as those of FIGS. 1 to 6 in which the bulb itself dips into the liquid refrigerant, the transfer of heat from its contents is very rapid, amounting almost to an on-off switching action, so that the pressure on the bellows tends to fluctuate rapidly, and this may cause hunting.

This is disadvantageous in practice. The effect of fitting the extended tail 196 is to cause the pressure acting on the bellows to decrease progressively as the level of refrigerant liquid rises, as the heat has a shorter path to pass through the extended tail from the sensor bulb. This prevents excessive hunting between maximum and minimum levels of the liquid refrigerant, and ensures that the pool of liquid does not rise and flood the nozzle assembly or heat exchanger.

A less refined response may suffice for some requirements, for example for the first stage of a two-stage cooler. In this case the tube 182 of FIG. 6 may itself afford the sensor bulb, being open at the upper end, and closed at the lower end which extends below the orifice or is provided with an extended tail doing so. This tube then contains a quantity of vapourisable liquid.

Figure 8:
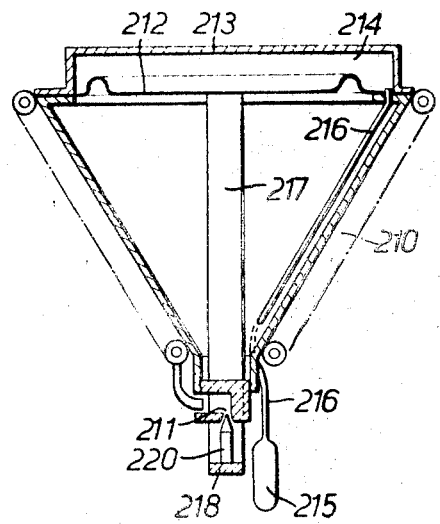

FIG. 8 is a diagram showing the application of the present invention to a cooler. The arrangement is generally similar to those already described above, except that in this case the heat exchanger 210 is of conical or frustoconical form, with its large end uppermost, and the expansion nozzle 211 situated at its lower end. A diaphragm 212 extends across the upper end and is closed by a cover 213 to form a closed chamber 214. A sensing bulb 215 extends down below the expansion nozzle and is connected by a tube 216 extending up inside the equipment and terminating in the closed chamber 214. The diaphragm is connected through an actuator 217 to a stirrup 218 carrying the needle regulator valve 220, which may be generally in accordance with the earlier figures. In other respects the construction may be as in the companion specification last referred to above.

The cooling apparatus may comprise two stages one or each of which may be arranged as in any of the embodiments described above.

In particular the first stage may incorporate an expansion engine working on the Claude cycle as described with reference to Fig. 8 of the specification first referred to above, while the second stage is as in the single-stage embodiments described above.

What I claim as my invention and desire to secure by Letters Patent is:

1. Cooling apparatus in which cooling is produced by expansion of a working fluid from a supply in gaseous form and at a temperature below its inversion temperature, through a nozzle, located in a container to produce a supply of liquefied working fluid which collects in the bottom of the container, including modulating means to modulate the amount of gas flowing through the nozzle including a sensor located in the container at least partly below the level of the nozzles, and so as to come into heat exchange relationship with the liquid, and arranged to reduce the amount of gas flowing through the nozzle, when the liquid level in the container exceeds a given level.

2. Cooling apparatus as claimed in claim 1 in which the flow of working fluid is regulated by altering the effective flow area of the expansion nozzle.

3. Cooling apparatus as claimed in claim 2 including a needle valve co-operating with a seating forming the expansion nozzle, to alter its effective flow area, and mounted to be movable transversely to centre itself relatively to it.

4. Cooling apparatus as claimed in claim 2 including a valve having a flat obturating surface co-operating with a flat seating to alter the effective flow area.

5. Cooling apparatus as claimed in claim 4 in which one of the co-operating flat surfaces is grooved to restrict the area over which pressure can build up, while providing an additional area limiting relative tilting.

6. Cooling apparatus including a generally tubular heat exchanger affording two paths through one of which refrigerant gas from a supply under pressure flows from one, warm end of the heat exchanger, and which in the normal position of use is uppermost, to the other, cold, end and thence to a Joule-Thomson expansion nozzle adjacent said other end, some of the gas being liquefied and collecting in a container while the remainder returns through the other path, said other path including a valve member co-operating with the nozzle to vary its effective area, and a sensor which is located in the container at least partly at a position more remote than the nozzle from the warm end, and arranged to come into heat exchange relationship with the liquid and then to move the valve to reduce the effective area of the expansion nozzle when the amount of liquid in the container exceeds a given quantity.

7. Cooling apparatus as claimed in claim 6 in which the sensor includes a vapour bulb situated within the container below the nozzle and communicating with an expansible member having a movable end connected to the valve member co-operating with the nozzle to alter its effective flow area.

8. Cooling apparatus as claimed in claim 6 in which the sensor includes a vapour bulb having an extended tail extending a substantial distance below the bottom of the vapor space so as to be progressively cooled by the liquefied working fluid as it rises towards the bottom of the vapour space.

9. Cooling apparatus as claimed in claim 6 in which the sensor and the expansion nozzle are offset in opposite directions from the axis of the apparatus, the sensor being spaced from other parts by a clearance sufficient to prevent retention of drops of liquid working fluid by capillary action.

10. Cooling apparatus as claimed in claim 6 including a bellows constituting the expansible member, an actuator extending down from the bellows past the nozzle to actuate the valve, and a guide blade guiding the actuator to move substantially in a straight line.

11. Cooling apparatus comprising two stages, both operating on the Joule-Thomson principle, at least one of which is provided with modulating means, as claimed in claim 6 for automatically modulating the amount of gas flowing through the nozzle of that stage.

References Cited

UNITED STATES PATENTS

| | | | |
|---|---|---|---|
| 2,909,908 | 10/1959 | Pastuhov et al. | 62—514 |
| 3,257,823 | 6/1966 | Hogan | 62—514 |
| 3,320,755 | 5/1957 | Jepsen et al. | 62—514 |
| 3,413,819 | 12/1968 | Hansen | 62—514 |

MEYER PERLIN, Primary Examiner

U.S. Cl. X.R.

62—514